(12) United States Patent
Yamaguchi

(10) Patent No.: US 9,361,708 B2
(45) Date of Patent: Jun. 7, 2016

(54) IMAGE PROCESSING DEVICE, IMAGE PROCESSING METHOD

(71) Applicant: FUJITSU LIMITED, Kawasaki-shi, Kanagawa (JP)

(72) Inventor: Nobuyasu Yamaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 300 days.

(21) Appl. No.: 14/039,831

(22) Filed: Sep. 27, 2013

(65) Prior Publication Data

US 2014/0168259 A1 Jun. 19, 2014

(30) Foreign Application Priority Data

Dec. 18, 2012 (JP) ................................. 2012-275282

(51) Int. Cl.
*G09G 5/00* (2006.01)
*G06T 11/00* (2006.01)
*G06Q 30/02* (2012.01)

(52) U.S. Cl.
CPC ................ *G06T 11/00* (2013.01); *G06Q 30/02* (2013.01)

(58) Field of Classification Search
CPC .......... G06T 19/00; G06T 11/60; G06K 7/14; G06K 7/10722; G06K 7/1443
USPC ......... 345/418, 619, 629, 632, 633, 634, 641; 235/462.01, 462.09, 462.1, 462.11, 235/462.12, 462.14, 462.25
See application file for complete search history.

(56) References Cited

U.S. PATENT DOCUMENTS

2013/0186957 A1 * 7/2013 Endo ...................... G06K 7/146
235/469

FOREIGN PATENT DOCUMENTS

| JP | 2005-165565 | | 6/2005 | |
| JP | 2005165565 A | * | 6/2005 | |
| JP | 2007-257360 | | 10/2007 | |
| WO | WO 2012014264 A1 | * | 2/2012 | ............... G06K 7/12 |

* cited by examiner

*Primary Examiner* — Xiao Wu
*Assistant Examiner* — Sarah Lhymn
(74) *Attorney, Agent, or Firm* — Staas & Halsey LLP

(57) ABSTRACT

An image processing device includes: a processor; and a memory which stores a plurality of instructions, which when executed by the processor, cause the processor to execute, acquiring an image to be displayed including a two-dimensional code and a positioning pattern superimposed, wherein the two-dimensional code defines information to be displayed on the basis of an image pattern including a first pixel value and a second pixel value, wherein the positioning pattern defines reference coordinates to display the information to be displayed; extracting the two-dimensional code from the image, using a first color component to extract a pixel value identified as the first pixel value and a pixel value identified as the second pixel value; and extracting the positioning pattern from the image using a second color component that identifies as identical to the first pixel value both pixel values that are identified as the first and second pixel values.

16 Claims, 14 Drawing Sheets

FIG. 6

| ID | HUE | RGB COLORSPACE ||| YUV COLORSPACE |||
|---|---|---|---|---|---|---|---|
| | | R COLOR COMPONENT | G COLOR COMPONENT | B COLOR COMPONENT | Y COLOR COMPONENT | U COLOR COMPONENT | V COLOR COMPONENT |
| 1 | WHITE | 255 | 255 | 255 | 255 | 87 | 41 |
| 2 | YELLOW | 255 | 255 | 0 | 226 | -41 | 20 |
| 3 | CYAN | 0 | 255 | 255 | 178 | 43 | -87 |
| 4 | GREEN | 0 | 255 | 0 | 150 | -84 | -107 |
| 5 | MAGENTA | 255 | 0 | 255 | 104 | 171 | 148 |
| 6 | RED | 255 | 0 | 0 | 76 | 43 | 128 |
| 7 | BLUE | 0 | 0 | 255 | 28 | 128 | 20 |
| 8 | BLACK | 0 | 0 | 0 | 0 | 0 | 0 |

IMAGE PROCESSING DEVICE, IMAGE PROCESSING METHOD

CROSS-REFERENCE TO RELATED APPLICATION

This application is based upon and claims the benefit of priority of the prior Japanese Patent Application No. 2012-275282, filed on Dec. 18, 2012, the entire contents of which are incorporated herein by reference.

FIELD

The embodiments discussed herein are related to an image processing device, image processing method, and image processing program that enable additional information to be displayed at any position on a display, for example.

BACKGROUND

Traditionally, paper media have been used to read documents including advertising or the like. With increasingly enhanced performance of computers and developing Internet technology, opportunities to read documents in electronic media are increasing. Advantages of using paper media include, but are not limited to, large size for legibility, low price, and easiness to grasp several sentences as a whole by quick overview. On the other hand, advantages of using electronic media include, but are not limited to, the following: dynamically changing information and video on the Internet may be displayed, and electronic media are easy to carry around. A new interface is being developed to enhance the potential of documents using electronic media, while taking advantages of the traditional paper media.

The interface above mentioned has functions to acquire an image including a two-dimensional code when the user captures the image of the two-dimensional code on a paper or other display medium in front of him/her using a camera fixed at a certain location or a freely movable camera, and then display additional information related to its document on a display. Recently, an information presentation method using augmented reality (AR) has been proposed as a technology for displaying additional information, which superimposes and displays additional information on a document image or a projected document.

More specifically, the information presentation method using augmented reality is characterized in that additional information corresponding to a two-dimensional code is superimposed and displayed on a display of a camera, camera-mounted PC, or mobile terminal, for example, on the basis of a reference point defined by the four corners and four sides of a captured image of the two-dimensional code and a physical coordinate system based on this reference point. This information presentation method enables the additional information to be related to its display position on a document image and thus enables cooperation between the paper medium and the electronic medium.

FIG. 1A illustrates an example of a document including advertising or the like and a two-dimensional code attached to this document. FIG. 1B illustrates an example of a document image and additional information displayed on a mobile terminal display. As illustrated in FIG. 1A, the two-dimensional code is positioned in a lower right corner of the document, for example, occupying a relatively small area so as not to affect the visibility and appearance of the document. As illustrated in FIG. 1B, a physical coordinate system may be defined as a reference for the two-dimensional code by defining four sides from the four corners of the two-dimensional code and defining a reference point on the basis of their intersections, for example. In addition, a display coordinate system may be defined as a reference for a captured image by defying the upper left corner of the document image displayed on a mobile terminal display as the origin of the display coordinates, for example. Additional information extracted from the modules included in the two-dimensional code is superimposed on the captured image and displayed on the mobile terminal display on the basis of the physical coordinate system and the display coordinate system. Japanese Laid-open Patent Publication No. 2007-257360 discloses a technology that provides a second module outside the two-dimensional code to enhance the performance of detection of the modules included in the two-dimensional code.

SUMMARY

In accordance with an aspect of the embodiments, an image processing device includes: a processor; and a memory which stores a plurality of instructions, which when executed by the processor, cause the processor to execute, acquiring an image to be displayed including a two-dimensional code and a positioning pattern superimposed, wherein the two-dimensional code defines information to be displayed on the basis of an image pattern including a first pixel value and a second pixel value, wherein the positioning pattern defines reference coordinates to display the information to be displayed; extracting the two-dimensional code from the image, using a first color component to extract a pixel value identified as the first pixel value and a pixel value identified as the second pixel value; and extracting the positioning pattern from the image using a second color component that identifies as identical to the first pixel value both pixel values that are identified as the first and second pixel values when the first color component is used.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 6 is a table illustrating an example of a data structure including the pixel values of color components of different colorspaces corresponding to various hues;

DESCRIPTION OF EMBODIMENTS

The inventors have revealed the following facts through our new investigations. To accurately superimpose additional information at a target position on a captured image, it is desirable to define a physical coordinate system as a reference for a two-dimensional code. To define the physical coordinate system, it is desirable to accurately define a reference point. Here, to accurately define the reference point, it is desirable to define four sides from the four corners of the two-dimensional code and then define the intersections of the four sides as described above. Since the two-dimensional code is a two-hued pattern of white and black, for example, it is difficult to accurately determine the boundary line positions along the four sides. In some two-dimensional codes, the four corners may include one white-hued corner, in which case the position of the vertex of this corner is not clearly represented as a graphic, making it difficult to define the four corners. Furthermore, a long imaging distance and a small physical size of the two-dimensional code degrade the resolution of the captured image and lower the accuracy of definition of the physical coordinate system.

Figure 1B:
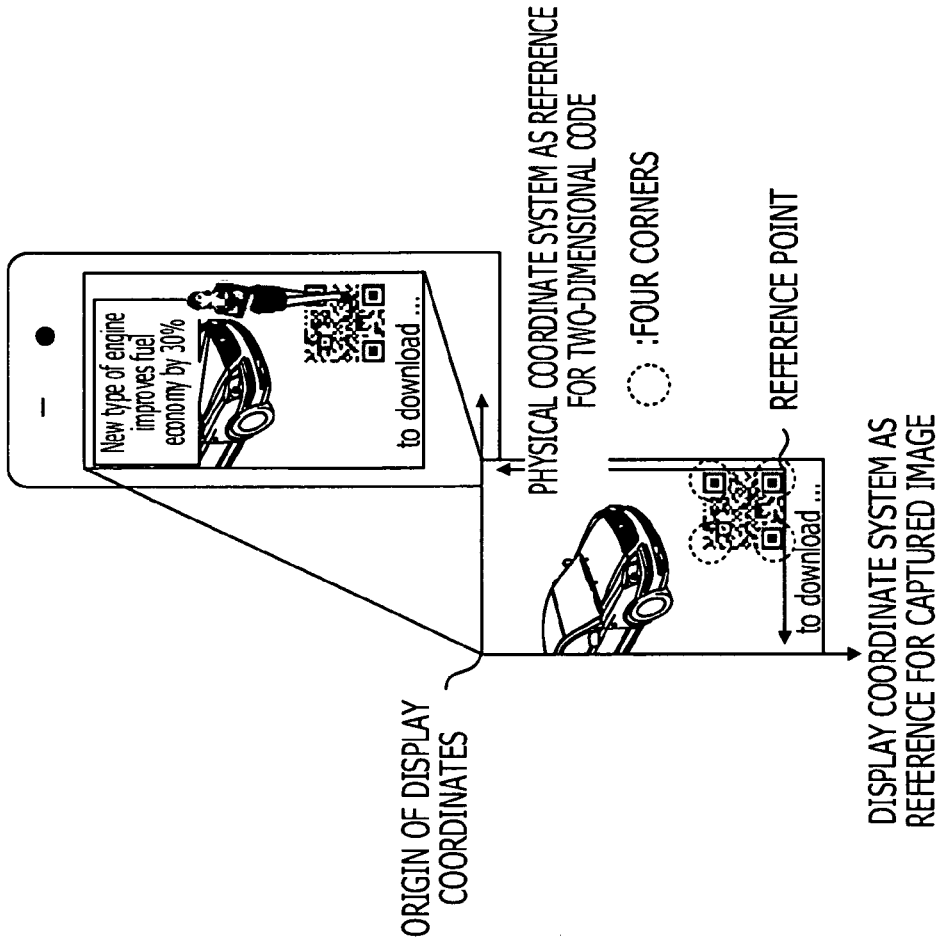
FIG. 1B illustrates, as related art, an example of a document image and additional information displayed on a mobile terminal display.
Figure 1A:
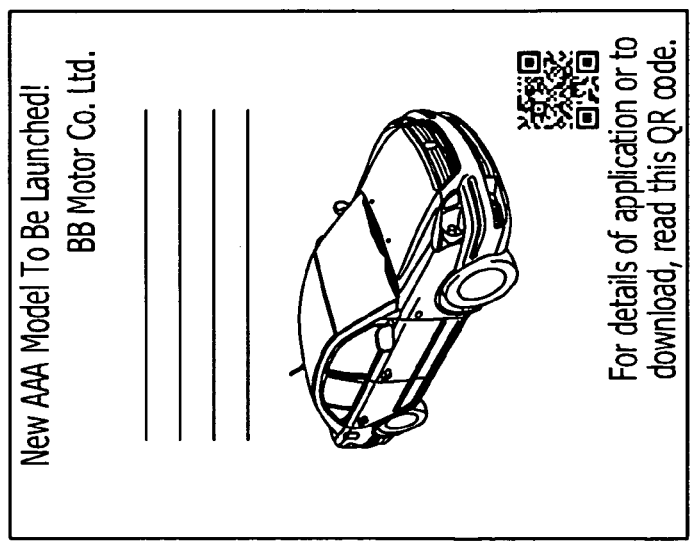
FIG. 1A illustrates, as related art, an example of a document including advertising or the like and a two-dimensional code attached to this document.
Figure 2A:
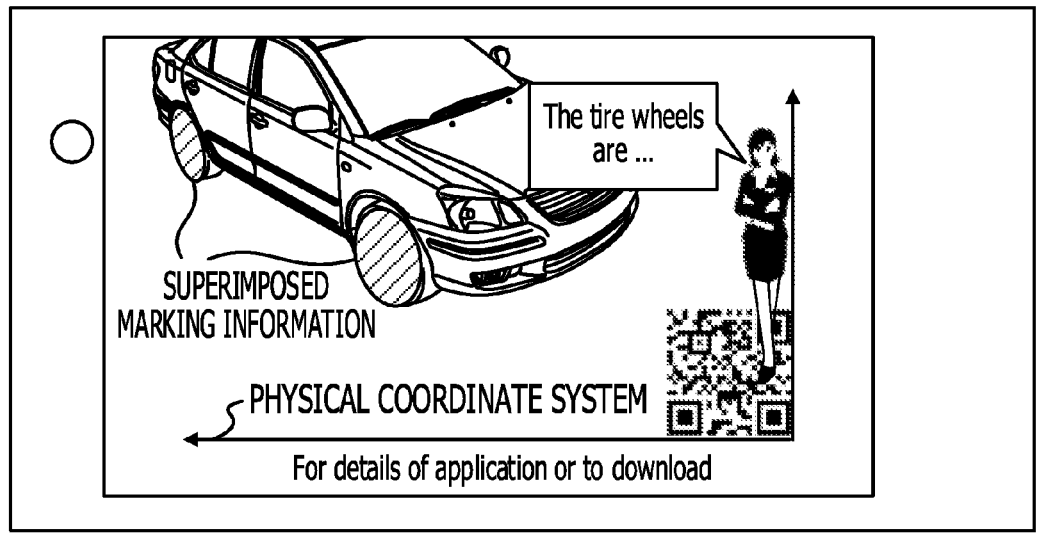
FIG. 2A illustrates an example of a captured image with additional information superimposed thereon when the physical coordinate system is accurately defined.
Figure 2B:
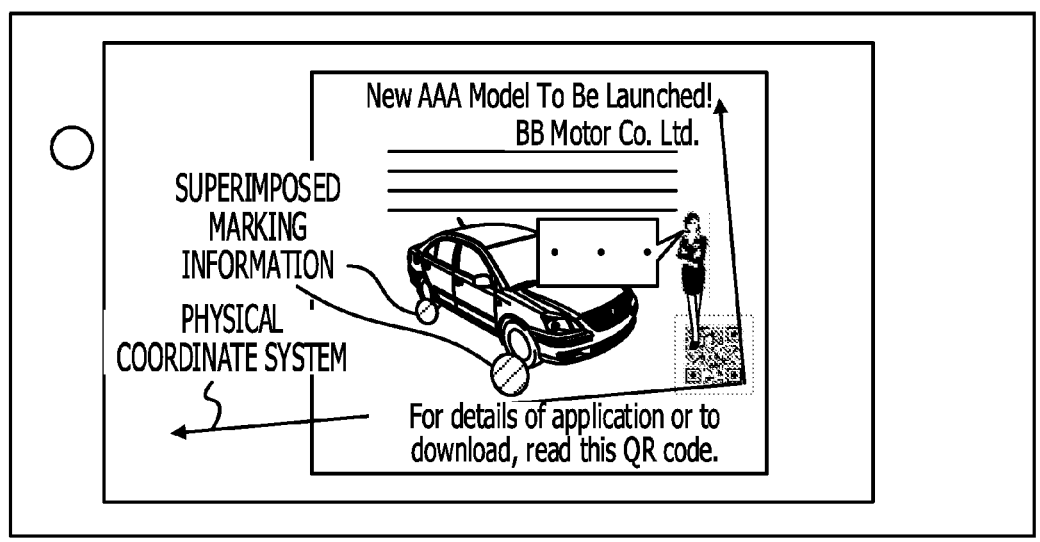
FIG. 2B illustrates an example of a captured image with additional information superimposed thereon when the physical coordinate system is not accurately defined.

FIG. 2A illustrates an example of a captured image with additional information superimposed thereon when the physical coordinate system is accurately defined. FIG. 2B illustrates an example of a captured image with additional information superimposed thereon when the physical coordinate system is not accurately defined. In FIG. 2A, in which the imaging distance is short, the physical coordinate system is accurately defined and additional information is accurately superimposed on the captured image without being displaced. In FIG. 2A, there are displayed as additional information, in addition to a narrator and a description of the tire wheels of a car by the narrator, marking information for attracting attention to the tire wheels is accurately superimposed and displayed on the captured image (such that the contours of the superimposed marking information and the tire wheels match).

On the other hand, in FIG. 2B, due to a long imaging distance, the physical coordinate system is inaccurately defined. In this case, the marking information included in the additional information is displayed without being accurately superimposed on the tire wheels of the car, failing to provide accurate information transmission. As illustrated in FIGS. 2A and 2B, a decreased resolution of the captured image lowers the accuracy of definition of the physical coordinate system. The instability in accuracy of definition of the reference point due to the characteristics of the two-hued pattern of the above two-dimensional code also affects the accuracy of definition of the physical coordinate system.

Figure 3A:
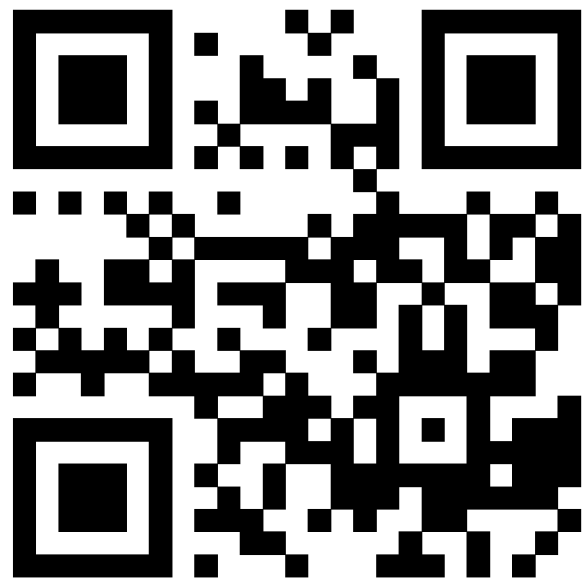
FIG. 3A is an example of a two-dimensional code.
Figure 3B:
FIG. 3B is an example of a positioning pattern.

The new investigations by the inventors have revealed that the accuracy of definition of the physical coordinate system may be enhanced when a single-hued (for example, black) pattern used to define the physical coordinate system (referred to hereinafter as the positioning pattern) is displayed separately from the two-dimensional code. FIG. 3A is an example of a two-dimensional code. FIG. 3B is an example of a positioning pattern. The two-dimensional code in FIG. 3A is a two-hued pattern of white and black. Since the two-dimensional code in FIG. 3A is a two-hued pattern of white and black as described above, it is difficult to accurately determine the boundary line positions along the four sides. Furthermore, since the four corners of this two-dimensional code include one white-hued corner and therefore the position of the vertex of this corner is not clearly represented as a graphic, it is difficult to define the four corners. On the other hand, the positioning pattern in FIG. 3B is a single-hued rectangular pattern of black, the four corners and four sides may uniquely be defined and therefore a reference point and a physical coordinate system based on this reference point may accurately be defined unlike the two-hued pattern of white and black of the two-dimensional code in FIG. 3A. Since the pixel values extracted from the positioning pattern are pixel values of continuous values of one (1), they are less affected by the resolution degradation due to the imaging distance than the two-dimensional code.

Considering the surface areas occupied by the two-dimensional code and the positioning pattern on the document, it is preferable to superimpose the two-dimensional code and the positioning pattern. If the two-dimensional code and the positioning pattern are simply superimposed, both hues would be mixed (becoming a single hue of black), resulting in the two-dimensional code and the positioning pattern becoming indistinguishable from each other. This would make it difficult to read the two-dimensional code and to define the physical coordinate system. As will be understood from the above description, there have not been proposed image processing devices capable of defining a physical coordinate system with high accuracy.

An image processing device, image processing method, and image processing program according to embodiments will be described with reference to the drawings. These embodiments do not limit the disclosed technology.

First Embodiment

Figure 4:
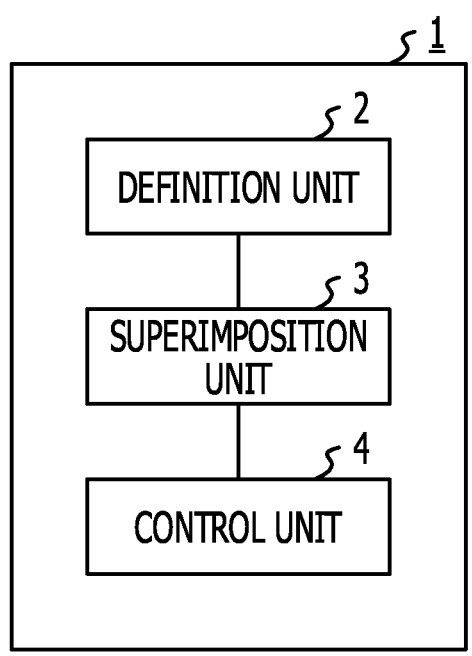
FIG. 4 is a functional block diagram of an image processing device according to an embodiment.

A first embodiment will now be described in which an image processing device generates superimposed cells in which a two-dimensional code and a positioning pattern are superimposed. FIG. 4 is a functional block diagram of an image processing device 1 according to an embodiment. The image processing device 1 has a definition unit 2, superimposition unit 3, and control unit 4.

The definition unit 2 is a hardware circuit using wired-logic, for example. The definition unit 2 may be a functional module implemented by a computer program executed by the image processing device 1. The definition unit 2 also has a communication unit (not illustrated) and is capable of exchanging data bidirectionally through a communication line with various external devices.

The definition unit 2 defines a two-dimensional code including modules that define additional information using a known technique, or receives a two-dimensional code from an external device. In the first embodiment, for illustrative convenience, the definition unit 2 defines a two-dimensional code with a two-hued pattern of white and black illustrated in FIG. 3A, for example, using a known technique. The additional information may be referred to as the information to be displayed or content information. The definition unit 2 also defines a single-hued positioning pattern of black illustrated in FIG. 3B, for example. Since the positioning pattern is a single-hued rectangular pattern of black, the positions of the four corners are clear and the four sides are continuous straight lines between the four corners, which enables a reference point and a physical coordinate system based on this reference point to be accurately defined, unlike the two-hued pattern of white and black of the two-dimensional code in FIG. 3A. Here, the positioning pattern may be treated as one aggregate module formed from black-hued modules of the two-dimensional code. In other words, the positioning pattern module is larger in size than the module forming the two-dimensional code. Since the positioning pattern has a rectangular shape, a reference point is defined by the four corners or four outer edges using a known technique, and a reference coordinate system is defined as appropriate on the basis of this reference point. Here, the reference coordinate system may be referred to as the reference coordinates. The definition unit 2 may define the two-dimensional code and the positioning pattern to be identical or different in size. In the first embodiment, for illustrative convenience, the definition unit 2 defines the two-dimensional code and the positioning pattern to be identical in size. The definition unit 2 outputs the defined two-dimensional code and positioning pattern to the superimposition unit 3.

The superimposition unit 3 is a hardware circuit using wired-logic, for example. The superimposition unit 3 may be a functional module implemented by a computer program executed by the image processing device 1. The superimposition unit 3 receives the two-dimensional code and positioning pattern from the definition unit 2. The superimposition unit 3 superimposes the two-dimensional code and the positioning pattern in a predetermined region. Here, the superimposition unit 3 may superimpose the two-dimensional code and the positioning pattern in a region where their outer frames match or only in a partial region. In the first embodiment, for illustrative convenience, the superimposition unit 3 superimposes the two-dimensional code and the positioning pattern in a predetermined region in which the outer frames (outer edges) of the two-dimensional code and positioning pattern match. The superimposition unit 3 outputs to the control unit 4 the initial superimposed code including the two-dimensional code and the positioning pattern superimposed in the predetermined region. The image processing device 1 may not necessarily have the superimposition unit 3; the function of the superimposition unit 3 may be held in the definition unit 2. The initial superimposed code may be referred to with another name as desired.

The control unit 4 is a hardware circuit using wired-logic, for example. The control unit 4 may be a functional module implemented by a computer program executed by the image processing device 1. The control unit 4 has a communication unit (not illustrated) and is capable to exchange data bidirectionally through a communication line with various external devices. The control unit 4 receives the initial superimposed code from the superimposition unit 3.

The control unit 4 controls (corrects) the hue of the white-hued modules of the two-dimensional code in the region in which the positioning pattern and the two-dimensional code are superimposed to yellow, for example. This purpose is to separate the superimposed two-dimensional code and the positioning pattern from each other, the reason of which will be discussed later in detail. In the first embodiment, one module of the two-hued pattern of the two-dimensional code is black, which is the same hue as the positioning pattern. Since the outer frames of the two-dimensional code and the positioning pattern match, the control unit 4 may simply control the hue of the white-hued modules of the two-dimensional code to yellow.

The control unit 4 outputs to an external device a first controlled superimposed code in which the hue of the region in which the positioning pattern and the two-dimensional code are superimposed in the initial superimposed code has been controlled to a predetermined hue. The external device may be a printer, for example, which prints the first controlled superimposed code processed by the image processing device 1 onto a printed paper medium. The external device may be a digital signage (electronic signboard), for example, which displays the first controlled superimposed code processed by the image processing device 1 on the digital signage display. The first controlled superimposed code may be referred to with another name as desired.

The image processing device 1 may be configured with an integrated circuit such as an application specific integrated circuit (ASIC) or a field programmable gate array (FPGA), for example.

Figure 5A:
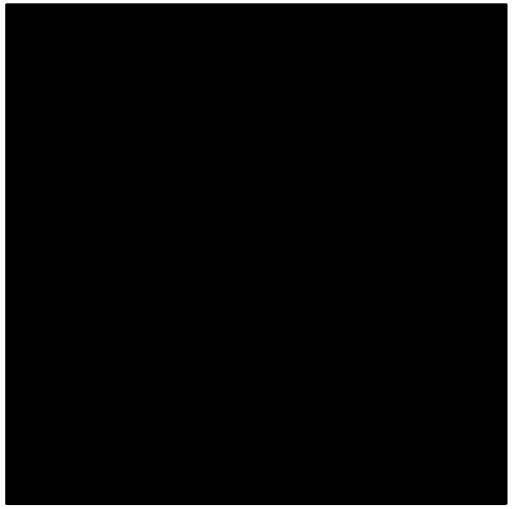
FIG. 5A illustrates an example of a first controlled superimposed code controlled by a control unit.
Figure 5B:
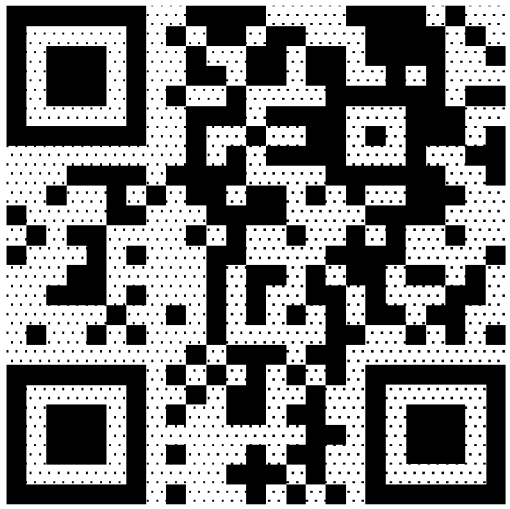
FIG. 5B illustrates an example of a two-dimensional code extracted from the first controlled superimposed code in FIG. 5A.
Figure 5C:
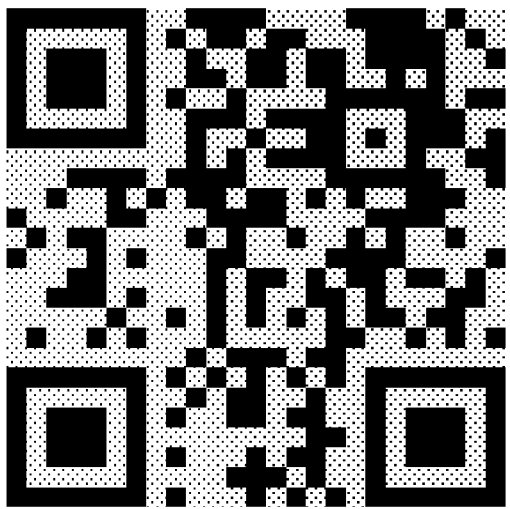
FIG. 5C illustrates an example of a positioning pattern extracted from the first controlled superimposed code in FIG. 5A.

FIG. 5A illustrates an example of a first controlled superimposed code controlled by the control unit 4. FIG. 5B illustrates an example of a two-dimensional code extracted from the first controlled superimposed code in FIG. 5A. FIG. 5C illustrates an example of a positioning pattern extracted from the first controlled superimposed code in FIG. 5A. The first controlled superimposed code in FIG. 5A includes the two-dimensional code and the positioning pattern superimposed such that their outer frames match as described above and has an appearance defined by a two-hued pattern of black and yellow. Next, the technical reason why the two-dimensional code and the positioning pattern in FIGS. 5B and 5C are extracted separately from the first controlled superimposed code in FIG. 5A will be described.

First, the technical reason why the two-dimensional code in FIG. 5B is separated and extracted from the first controlled superimposed code in FIG. 5A will be described. FIG. 6 is a table illustrating an example of a data structure including the pixel values of the color components forming colorspaces for different hues. As illustrated in the table 60 in FIG. 6, each hue has pixel values of the three color components and may be represented by an RGB colorspace. The hue may also be represented in a YUV colorspace in which the hue is represented by a combination of a luminance component Y and color difference components U (degree of blueness; difference between luminance signal and blue color component) and V (degree of redness; difference between luminance signal and red color component) using the following formula:

$Y=0.30R+0.59G+0.11B$ $U=0.17R-0.33G+0.50B$ $V=0.50R-0.42G+0.08B$ (1)

The table 60 in FIG. 6 lists pixel values that represent different hues using R (red), G (green), and B (blue) color components forming the RGB colorspace, or Y (luminance), U (degree of blueness), and V (degree of redness) color components forming the YUV colorspace.

Described below is a case in which the Y color component of the YUV colorspace is used to extract pixel values from the first controlled superimposed code having an appearance represented by a two-hued pattern of black and yellow in FIG. 5A. When pixel values are extracted using the Y color component, the pixel value of the black-hued modules in the first controlled superimposed code becomes zero (0) and the pixel value of the yellow-hued modules becomes 226 as illustrated in the table 60 in FIG. 6. When the Y color component is used to extract pixel values, modules of two pixel values 0 and 226 are extracted as illustrated in FIG. 5B. When the Y color component is used to extract a pixel value from the white-hued modules in the two-dimensional code in FIG. 3A, defined by the definition unit 2 in FIG. 4, the pixel value is 255, which is the pixel value closest to the pixel value of yellow among the hues of IDs listed in the table 60 in FIG. 6.

In a typical module determination process (process to determine whether the hue of the module is white or black) on a conventional two-dimensional code having a two-hued pattern of black and white, a pixel value equal to or more than 128, for example, is used as a threshold value (which may be referred to as the first threshold value). The pixel value extracted from the yellow-hued modules is therefore discriminated from the pixel value extracted from the black-hued modules with a sufficient resolution. This enables the two-dimensional code to be extracted from the first controlled superimposed code.

Next, the technical reason why the positioning pattern in FIG. 5C is separated and extracted from the first controlled superimposed code in FIG. 5A will be described. When the Y color component of the YUV colorspace in the table 60 in FIG. 6 is used to extract pixel values from the first controlled superimposed code, as in the case of the two-dimensional code described above, modules with pixel value 0 and pixel value 226 are mixed as illustrated in FIG. 5B, which makes it difficult to accurately extract the positioning pattern. From a different point of view, suppose a case in which the B color component of the RGB colorspace is used to extract pixel values. When pixel values are extracted from the first controlled superimposed code using the B color component, the pixel value of the black-hued modules becomes zero (0) and the pixel value of the yellow-hued modules also becomes zero (0) as illustrated in the table 60 in FIG. 6, resulting in both pixel values coincidentally becoming the same value of zero (0). Since the pixel value extracted using the B color component from the black-hued positioning pattern in FIG. 3B, defined by the definition unit 2 in FIG. 4, is also zero (0), the positioning pattern in FIG. 5C is extracted in a completely reproduced state. This enables the positional pattern to be extracted from the first controlled superimposed code. Even if the hues of the first controlled superimposed code do not completely match, the positioning pattern may be extracted by performing module determination using a threshold value of less than 128, for example.

Although different colorspaces, that is, YUV and RGB colorspaces, are used in the first embodiment, data cells and a positioning pattern may be extracted using a single colorspace. If the yellow-hued modules of the first controlled superimposed code in FIG. 5A are controlled to cyan, the two-dimensional code may be extracted using the B color component of the RGB colorspace and the positioning pattern may be extracted using the R color component of the same RGB colorspace.

Although the first embodiment is described using the two-dimensional code including black- and white-hued modules, the positioning pattern and the two-dimensional code may be extracted separately from the first controlled superimposed code including a two-dimensional code including different-hued modules. This enables the image processing device 1 to define the first controlled superimposed code considering the background color or the like of the printed matter. If the hue of the black module of the two-dimensional code in FIG. 3A is changed to red, for example, the hue of the white module may be corrected to yellow in the region in which the two-dimensional code and the positioning pattern are superimposed. In this case, the two-dimensional code may be extracted using the Y color component and the positioning pattern may be extracted using the B color component. More specifically, the two-dimensional code is extracted because pixel value 76 (red) and pixel value 226 (yellow) or 255 (white) are extracted using the Y color component. The positioning pattern is extracted because only pixel values 0 (red and yellow) or pixel values 0 (red and yellow) and pixel value 255 (white) distinguishable from pixel value 0 are extracted using the B component.

If the hue of the white modules of the two-dimensional code in FIG. 3A is changed to yellow, the hue of the yellow-hued modules may be corrected to cyan in the region in which the two-dimensional code and the positioning pattern are superimposed. In this case, however, it is desirable to superimpose the two-dimensional code and the positioning pattern such that their outer frames match. In this case, the two-dimensional code may be extracted using the Y color component and the positioning pattern may be extracted using the R color component. More specifically, the two-dimensional code is extracted because pixel value 178 (cyan) or 0 (black) is extracted using the Y color component. The positioning pattern is extracted because only pixel values 0 (cyan and black) are extracted using the R component.

The image processing device according to the first embodiment may improve the accuracy of definition of a physical coordinate system.

Second Embodiment

Although the definition unit 2 in the first embodiment illustrated in FIG. 4 defines a single-hued positioning pattern of black in FIG. 3B, for example, the definition unit 2 may also define a positioning pattern using two different hues and the control unit 4 may control this positioning pattern.

Figure 7A:
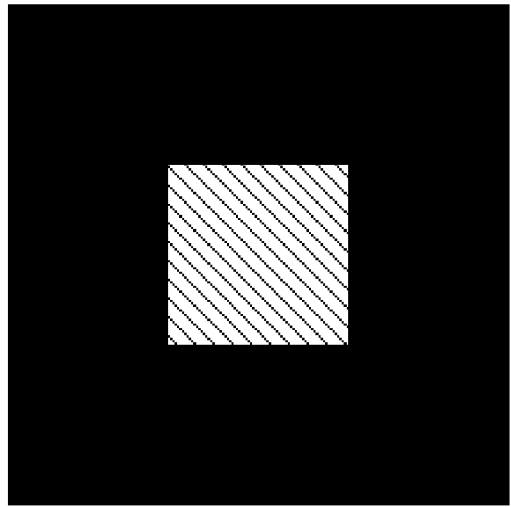
FIG. 7A illustrates an example of a second controlled superimposed code controlled by the control unit.
Figure 7B:
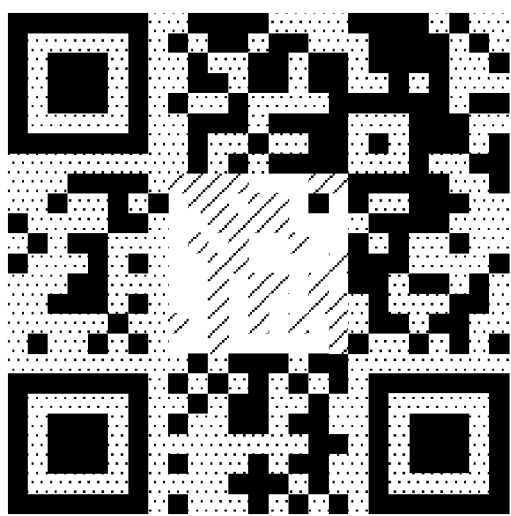
FIG. 7B illustrates an example of a two-dimensional code extracted from the second controlled superimposed code in FIG. 7A.
Figure 7C:
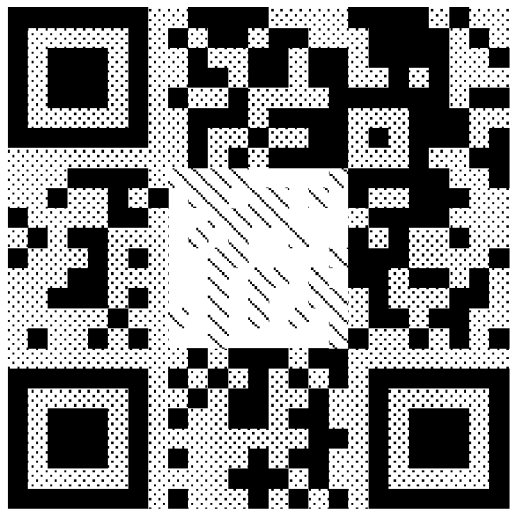
FIG. 7C illustrates an example of a positioning pattern extracted from the second controlled superimposed code in FIG. 7A.

FIG. 7A illustrates an example of a second controlled superimposed code controlled by the control unit 4. FIG. 7B illustrates an example of a two-dimensional code extracted from the second controlled superimposed code in FIG. 7A. FIG. 7C illustrates an example of a positioning pattern extracted from the second controlled superimposed code in FIG. 7A. The positioning pattern defined by the definition unit 2 in the second embodiment has blue-hued cells surrounded by black-hued cells as illustrated in FIG. 7C. The ratio in surface area of the black-hued cells to the blue-hued cells is defined to be nine to one, for example. As in the first embodiment, the second controlled superimposed code in FIG. 7A includes a two-dimensional code and a positioning pattern that are superimposed such that their outer frames match. The second controlled superimposed code is defined using a four-hued pattern of black, yellow, blue, and white. The technical reason why the two-dimensional code and the positioning pattern in FIGS. 7B and 7C are extracted separately from the second controlled superimposed code in FIG. 7A will now be described.

Described first is a case in which the Y color component of the YUV colorspace is used to extract pixel values from the second controlled superimposed code in FIG. 7A defined with a four-hued pattern of black, yellow, blue, and white. When pixel values are extracted using the Y color component, the pixel value of the black-hued modules of the second controlled superimposed code becomes 0, the pixel value of the yellow-hued modules becomes 226, the pixel value of the blue-hued modules becomes 28, and the pixel value of the white-hued modules becomes 255, as illustrated in the table 60 in FIG. 6. When pixel values are extracted using the Y color component, modules with pixel values 0, 28, 226, and 255 are extracted as illustrated in the table 60 in FIG. 6.

In a typical module determination process in a conventional two-dimensional code including a two-hued pattern of black and white, pixel value 128, for example, is used as a threshold value as described above. This enables the pixel values extracted from the yellow- and white-hued modules to be discriminated from the pixel values extracted from the black- and blue-hued modules with a sufficient resolution. Accordingly, the two-dimensional code is extracted from the second controlled superimposed code.

Next, the technical reason why the positioning pattern in FIG. 7C is separated and extracted from the second controlled superimposed code in FIG. 7A will be described. When pixel values are extracted using the B color component, the pixel values of the black- and yellow-hued modules of the second controlled superimposed code become zero (0) and the pixel values of the white- and blue-hued modules become 255 as illustrated in the table 60 in FIG. 6. When the B color component is used to extract a pixel value from the black-hued positioning pattern in FIG. 7C defined by the definition unit 2 in FIG. 4, the pixel value is 0. Since the pixel value extracted using the B color component from the blue-hued positioning pattern in FIG. 7C is 255, the positioning pattern in FIG. 7C is extracted in a completely reproduced state. Accordingly, the positioning pattern is extracted from the second controlled superimposed code. Even if the hues of the second controlled superimposed code do not completely match, the positioning pattern may be extracted by performing module determination using a threshold value less than 128, for example.

The image processing device according to the second embodiment may improve the accuracy of definition of the physical coordinate system. Furthermore, since the positioning pattern may have two hues, additional information may be attached to the positioning pattern using a difference between the hues. The additional information may be used to allow the image processing device that acquires the second controlled superimposed code to recognize the presence or absence of the positioning pattern, for example.

Third Embodiment

Figure 8:
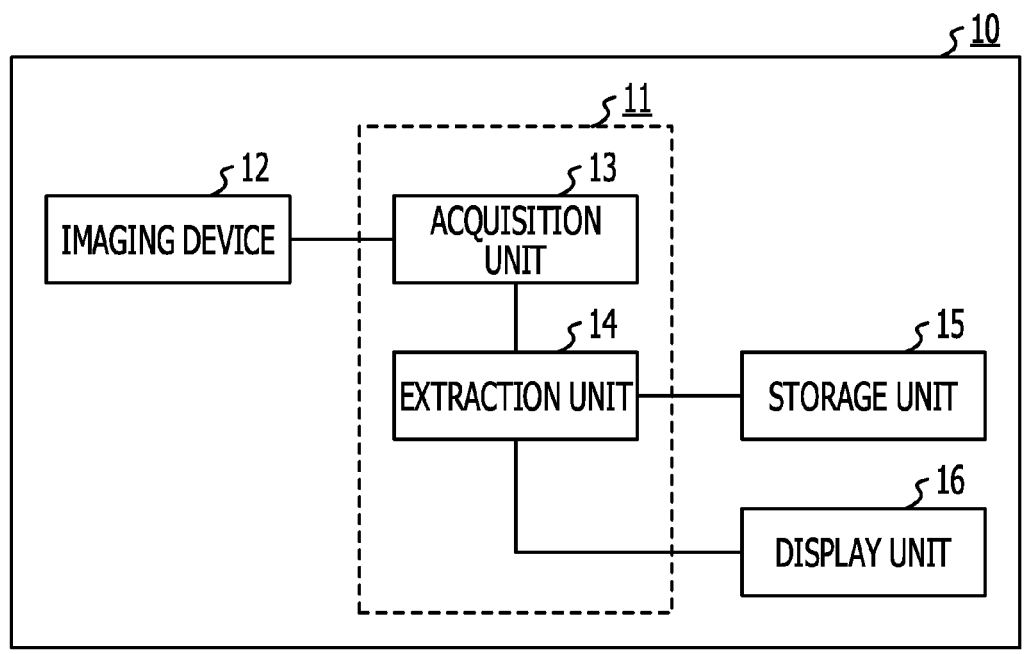
FIG. 8 is a functional block diagram of an information presentation device including an image processing device according to an embodiment.

A third embodiment will now be described. In the third embodiment, an image processing device reads superimposed cells in which a two-dimensional code and a positioning pattern are superimposed. FIG. 8 is a functional block diagram of an information presentation device 10 including an image processing device 11 according to an embodiment. The information presentation device 10 includes an image processing device 11, imaging device 12, storage unit 15, and display unit 16. The image processing device 11 includes an acquisition unit 13 and extraction unit 14.

The information presentation device 10 is an information device, such as a personal computer (PC) or mobile terminal, operated by a user, for example. The information presentation device 10 also includes a communication unit (not illustrated) and is capable of exchanging data bidirectionally through a communication line with various external devices.

The imaging device 12 is an imaging device such as a charge coupled device (CCD) or complementary metal oxide semiconductor (CMOS) camera, for example. The imaging device 12 may also be used as a head mounted camera (HMC). The imaging device 12 captures an image of a document including advertising or the like printed on a paper medium and/or a two-dimensional code included in this document, for example. The imaging device 12 may not necessarily be included in the information presentation device 10. For example, the imaging device 12 may be installed in the information presentation device 10 or in an external device other than the information presentation device 10 via a communication line. In the latter case, a communication unit (not illustrated) installed in the image processing device 11 is used.

The acquisition unit 13 is a hardware circuit using wired-logic, for example. The acquisition unit 13 may be a functional module implemented by a computer program executed by the image processing device 11. The acquisition unit 13 receives from the imaging device 12 an image captured by the imaging device 12. The acquisition unit 13 also acquires superimposed two-dimensional code and positioning pattern included in this image and outputs the superimposed two-dimensional code and positioning pattern to the extraction unit 14. In the third embodiment, for illustrative convenience, the acquisition unit 13 acquires the first controlled superimposed code illustrated in FIG. 5A and outputs this first controlled superimposed code to the extraction unit 14.

The extraction unit 14 is a hardware circuit using wired-logic, for example. The extraction unit 14 may be a functional module implemented by a computer program executed by the image processing device 11. The extraction unit 14 receives the first controlled superimposed code from the acquisition unit 13. The extraction unit 14 extracts a two-dimensional code and a positioning pattern from the first controlled superimposed code using predetermined first and second color components. Here, the first color component is the Y color component of the YUV colorspace and the second color component is the B color component of the RGB colorspace, for example.

The method of extraction used by the extraction unit 14 to extract the two-dimensional code from the first controlled superimposed code will now be described. As in the first embodiment described above, when the Y color component is used to extract pixel values from the first controlled superimposed code, the pixel value of the black-hued modules becomes zero (0) and the pixel value of the yellow-hued modules becomes 226 as illustrated in the table 60 in FIG. 6. In typical module determination in a conventional two-dimensional code having a two-hued pattern of black and white, a pixel value equal to or more than 128, for example, is used as a threshold value (which may be referred to as the first threshold value). The pixel value extracted from the yellow-hued modules is therefore discriminated from the pixel value extracted from the black-hued modules with a sufficient resolution. The pixel value extracted using the Y color component from the white-hued modules of the two-dimensional code in FIG. 3A, defined by the definition unit 2 in FIG. 4, becomes 225. More specifically, if the pixel value of the black-hued modules in the two-dimensional code or controlled superimposed code is identified as the first pixel value and the pixel value of the white-hued modules is identified as the second pixel value, the pixel value of the yellow-hued modules is also identified as the second pixel value. This enables the extraction unit 14 in FIG. 8 to extract the two-dimensional code from the first controlled superimposed code.

Next, the method of extraction used by the extraction unit 14 to extract the positioning pattern from the first controlled superimposed code will be described. When the B color component is used to extract pixel values, the pixel value of the black-hued modules of the first controlled superimposed code becomes zero (0) and the pixel value of the yellow-hued modules also becomes zero (0) as illustrated in the table 60 in FIG. 6, resulting in both pixel values coincidentally becoming the same value of zero (0). Since the pixel value extracted using the B color component from the black-hued positioning pattern in FIG. 3B defined by the definition unit 2 in FIG. 4 is also zero (0), the positioning pattern in FIG. 5C is extracted in a completely reproduced state. This means that the pixel values of both the black-hued modules and the yellow-hued modules in the controlled superimposed code or positioning pattern are identified as the first pixel values. This enables the extraction unit 14 in FIG. 8 to extract the positioning pattern from the first controlled superimposed code. Even if the hues of the first controlled superimposed code do not completely match, the extraction unit 14 may extract the positioning pattern by performing module determination using a threshold value less than 128, for example.

Here, the extraction unit 14 may receive information of the predetermined first and second color components via the communication unit (not illustrated) from the image processing device 1 in FIG. 4, which generates the first controlled superimposed code. The extraction unit 14 may hold in advance the information of the first and second color components in a cache or memory (not illustrated) in the extraction unit 14. Furthermore, the extraction unit 14 may dynamically select the first and second color components. For example, to extract a two-dimensional code from the first controlled superimposed code using a predetermined first threshold value (pixel value 128, for example), the extraction unit 14 may select a color component equal to or more than the first threshold value and, to extract a positioning pattern, the extraction unit 14 may select a color component less than the first threshold value. The number of threshold values is not limited to one; a plurality of threshold values may be used.

The extraction unit 14 in FIG. 8 extracts additional information from the extracted two-dimensional code. The extraction unit 14 may receive additional information from the storage unit 15 by accessing the storage unit 15, if desired, on the basis of the information attached to the two-dimensional code. The extraction unit 14 defines four corners and four sides of the extracted positioning pattern and defines a reference point and a physical coordinate system based on this reference point using a known technique. The extraction unit 14 also defines a display coordinate system as a reference for the captured image by defining the upper left corner of the captured image as the origin of the display coordinates. The extraction unit 14 outputs to the display unit 16 a superimposed image having the additional information superimposed on the captured image on the basis of the physical coordinate system and display coordinate system.

The storage unit 15 is a flash memory or other semiconductor memory device or a hard disk drive (HDD), optical disk, or other storage device, for example. The storage unit 15 is not limited to the storage devices mentioned above; it may be a random access memory (RAM) or a read only memory (ROM). The storage unit 15 stores various data such as additional information, for example. The storage unit 15 may not necessarily be included in the information presentation device 10. For example, the various data may be stored in a cache or memory (not illustrated) in a functional unit included in the image processing device 11. The storage unit 15 may be installed in the information presentation device 10 or in an external device other than the information presentation device 10 via a communication line. In the latter case, a communication unit (not illustrated) installed in the image processing device 11 is used.

The display unit 16 is a display device such as a display (including a digital signage), projector, or head mounted display (HMD), for example. The display unit 16 receives from the extraction unit 14 a superimposed image including additional information superimposed on a captured image and displays the superimposed image. The display unit 16 may not necessarily be included in the information presentation device 10. For example, the display unit 16 may be installed in the information presentation device 10 or in an external device other than the information presentation device 10 via a communication line. In the latter case, a communication unit (not illustrated) installed in the image processing device 11 is used.

The image processing device 11 may be configured with an integrated circuit such as an application specific integrated circuit (ASIC) or a field programmable gate array (FPGA), for example.

Figure 9:
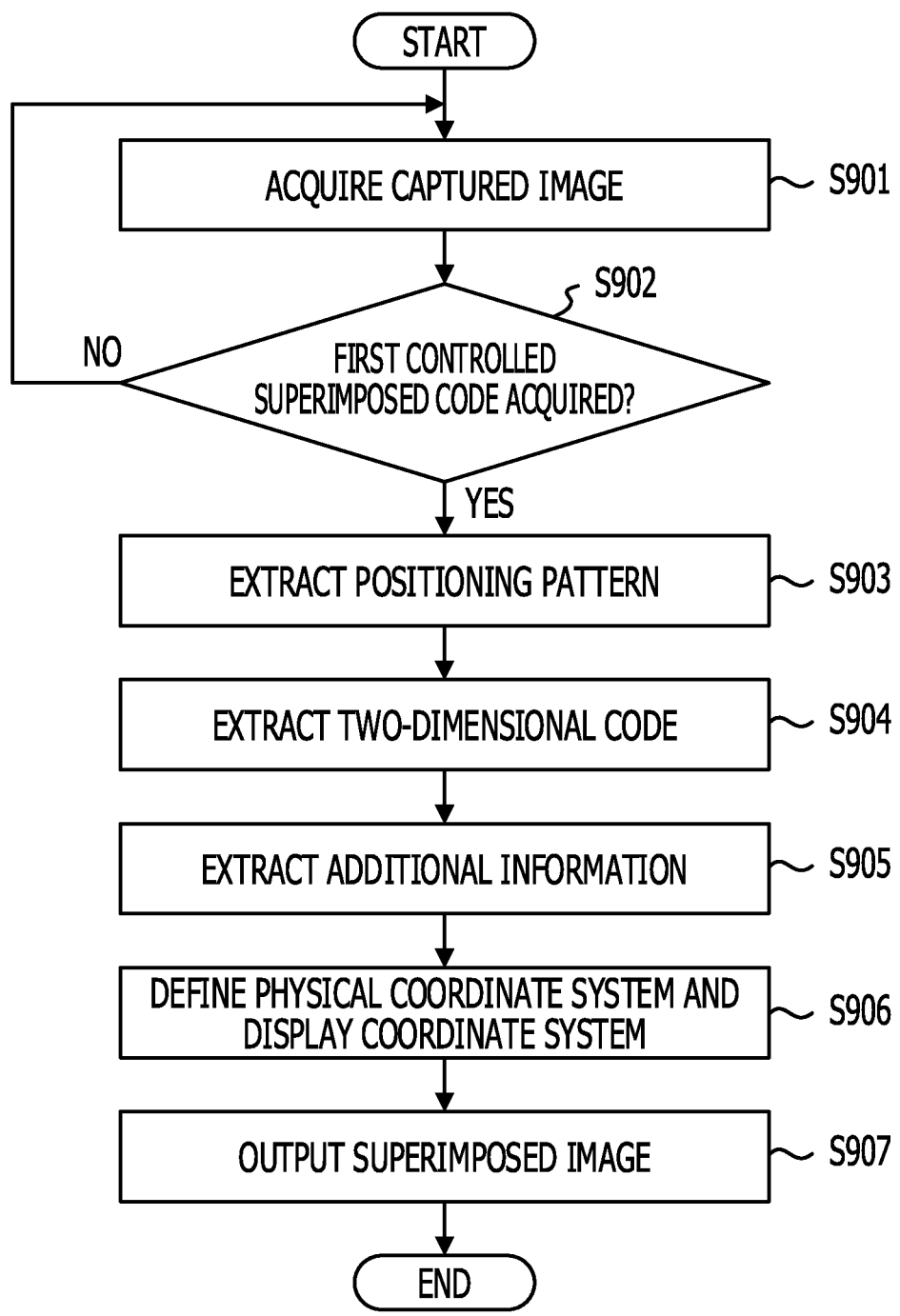
FIG. 9 is a flowchart illustrating first image processing performed by the image processing device.

FIG. 9 is a flowchart illustrating first image processing performed by the image processing device 11. In FIG. 9, the acquisition unit 13 receives from the imaging device 12 an image captured by the imaging device 12 (step S901). The acquisition unit 13 determines whether superimposed two-dimensional code and positioning pattern (first controlled superimposed code) are included in the image (step S902); if included (Yes in step S902), it acquires the first controlled superimposed code (Yes in step S902). If the first controlled superimposed code is not included in the acquired image (No in step S902), the acquisition unit 13 receives the image again from the imaging device 12 (step S901).

The extraction unit 14 receives the first controlled superimposed code from the acquisition unit 13. The extraction unit 14 extracts the two-dimensional code and the positioning pattern from the first controlled superimposed code using predetermined first and second color components (steps S903 and S904). Here, the first color component is the Y color component of the YUV colorspace and the second color component is the B color component of the RGB colorspace, for example.

The extraction unit 14 extracts additional information from the extracted two-dimensional code (step S905). The extraction unit 14 may receive the additional information from the storage unit 15 by accessing the storage unit 15, if desired, on the basis of the information attached to the two-dimensional code.

The extraction unit 14 defines four corners and four sides of the extracted positioning pattern and defines a reference point and a physical coordinate system based on this reference point using a known technique. The extraction unit 14 defines a display coordinate system as a reference for the captured image by defining the upper left corner of the captured image as the origin of the display coordinates (step S906).

The extraction unit 14 outputs to the display unit 16 the superimposed image including the additional information superimposed on the captured image on the basis of the physical coordinate system and display coordinate system (step S907) before completing the image processing in FIG. 9.

The image processing device according to the third embodiment may improve the accuracy of definition of the physical coordinate system.

Fourth Embodiment

In the image processing device 11 in FIG. 8, a significantly long imaging distance naturally degrades the resolution of the captured image due to the optical properties of the imaging device 12. In this case, it is supposed that the two-dimensional code separated from the first controlled superimposed code may be difficult to read and the additional information may not be extracted. This phenomenon also occurs when a two-dimensional code is read in a conventional image processing device. The inventors have newly verified that, if this phenomenon occurs, the user may have difficulty in figuring out an imaging distance at which the two-dimensional code is readable, because there are no guidelines for the user about the imaging process. A fourth embodiment will now be described in which appropriate guidelines may be provided to the user by making use of the relationship in module size between the two-dimensional code and the positioning pattern. In the image processing device in the fourth embodiment, which has a similar configuration to the image processing device 11 in FIG. 8, the extraction unit 14 performs the following process, for example.

Between MSIZE2d, which indicates the size of one module forming the two-dimensional code, and MSIZEp, which indicates the size of one module forming the positioning pattern (the same value as the size of the positioning pattern in FIG. 3C or 5C), the relationship indicated by the following formula is established:

$$MSIZEp = \alpha m \times MSIZE2d (\alpha m > 1.0) \quad (2)$$

In the example illustrated in FIGS. 3A and 3B or FIGS. 5B and 5C, $\alpha m$ is 25. This means that the positioning pattern may be detected at an imaging distance up to 25 times the two-dimensional code.

Here, assume that the number of pixels of one module forming the two-dimensional code is MPIX2d and the number of pixels of one module forming the positioning pattern is MPIXp. The values of MPIX2d and MPIXp vary with the imaging distance. In other words, the longer the imaging distance is, the more the resolution of the captured image degrades and the more the MPIX2d and MPIXp values are reduced.

In the fourth embodiment, it is possible to calculate MPIX2d using the above formula 2 and the following formula 3 by making use of MPIXp which includes more pixels and is easier to detect than MPIX2d:

$$MPIX2d = MPIXp/\alpha m \quad (3)$$

The extraction unit 14 may use MPIXp as a criterion to determine the extractability of the additional information from the two-dimensional code and to determine the accuracy of definition of the physical coordinate system from the positioning pattern.

Figure 10:
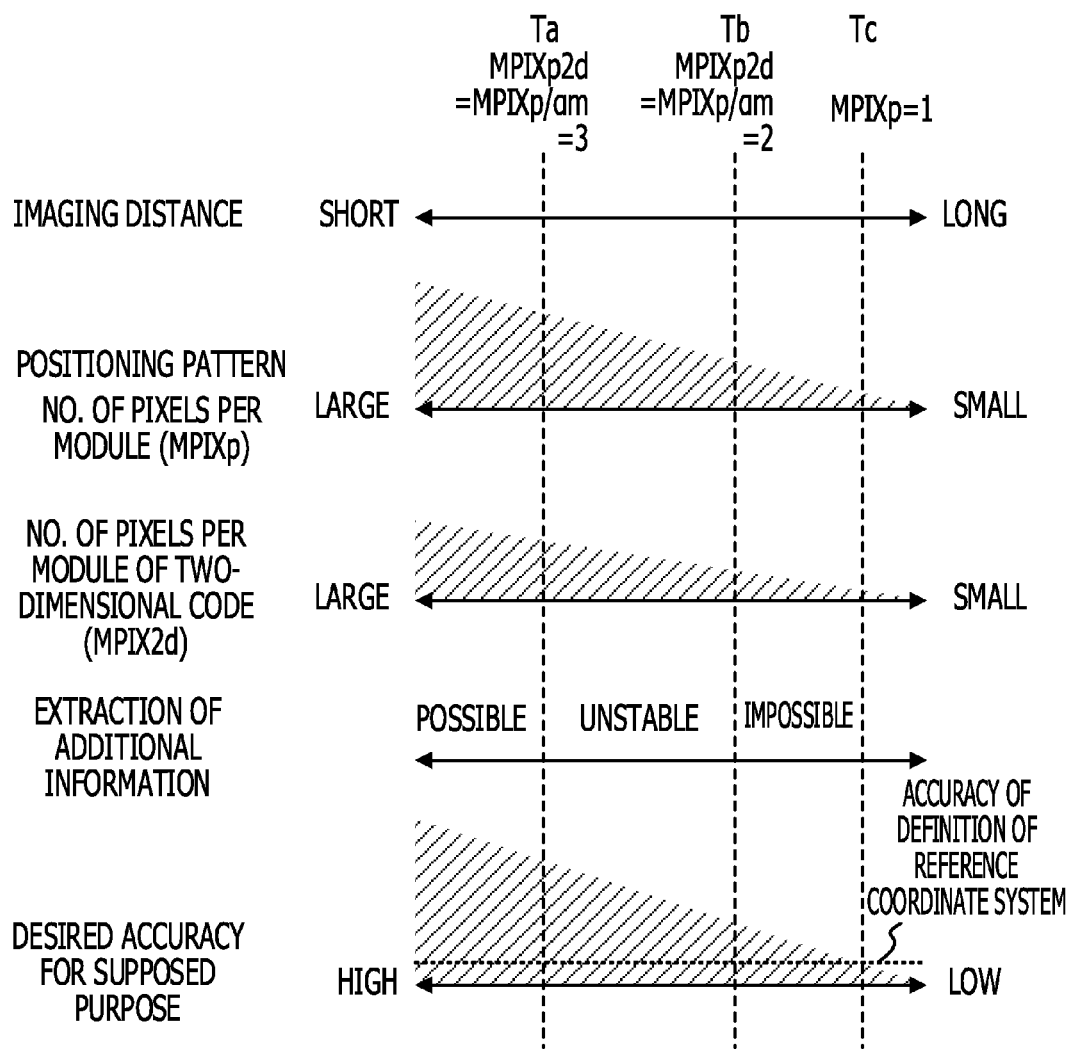
FIG. 10 illustrates a relationship diagram of the variations of MPIX2d and MPIXp that vary with the imaging distance to the extractability of additional information and the accuracy of definition of the physical coordinate system.

FIG. 10 is a relationship diagram of the extractability of the additional information and the accuracy of definition of the physical coordinate system to the variations of MPIX2d and MPIXp that vary with the imaging distance. As illustrated in FIG. 10, when MPIX2d is equal to or more than a predetermined value Ta (MPIX2d=3, for example), the extraction unit 14 may stably extract the additional information from the two-dimensional code. If MPIX2d is less than Ta, an instability may arise in the extraction of the additional information. If MPIX2d is less than a predetermined value Tb (MPIX2d=2, for example), it is theoretically difficult to extract additional information due to a restricted resolution. The predetermined values Ta and Tb may be set as appropriate on the basis of an algorithm for the extraction of additional information by the extraction unit 14.

As illustrated in FIG. 10, the accuracy of definition of the physical coordinate system monotonously decreases as the MPIXp value decreases. Although the degree of degradation in accuracy of definition of the physical coordinate system depends on the calculation algorithm for a physical coordinate system definition process performed by the extraction unit 14, there are no predetermined values (such as Ta and Tb, for example) that clearly determine the performance limit as in the extraction of the additional information described above. The user may define therefore an accuracy of definition desired for a supposed purpose and use a specific minimum value that satisfies this accuracy as Tc (MPIXp=1, for example).

Figure 11A:
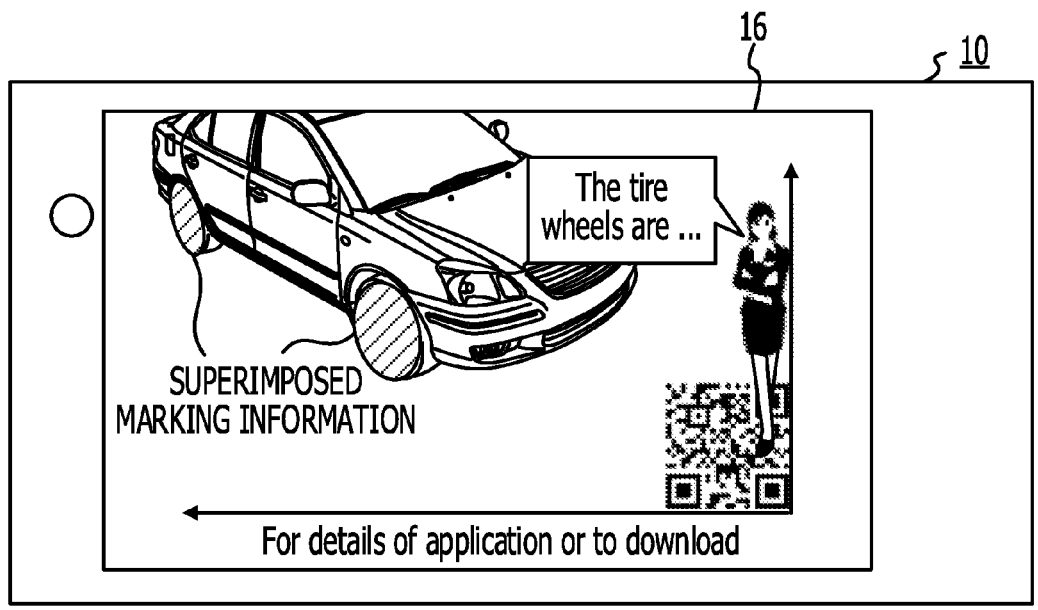
FIG. 11A illustrates an example of a superimposed image in the range of MPIXp>Ta.

In FIG. 10, in the range of MPIXp>Ta, the extraction unit 14 successfully extracts additional information and the physical coordinate system is defined with high accuracy. FIG. 11A illustrates an example of a superimposed image in the range of MPIXp>Ta. In FIG. 11A, in the range of MPIXp>Ta, the physical coordinate system is defined with high accuracy and the additional information is accurately superimposed at its target positions without being displaced, similarly to in FIG. 2A. In FIG. 11A, in addition to the additional information including the narrator and the description of the tire wheels of the car by the narrator, superimposed marking information for attracting attention to the tire wheels are accurately displayed on the captured image (such that the contours of the superimposed marking information and the tire wheels match) on the display unit 16 included in the information presentation device 10 in FIG. 8.

In FIG. 10, in the range of Ta≤MPIXp<Tb, an instability may arise in the additional information extraction process performed by the extraction unit 14. In such a case, the extraction unit 14 may perform a correction process using the super-resolution process disclosed by Kato et. al, "QR Code® recognition based on super-resolution using binary pattern constraint", The Institute of Electronics, Information and Communication Engineers, 2010, or a typical complementary process. With this, the extraction unit 14 may detect additional information with an enhanced accuracy. Furthermore, the fourth embodiment may reduce the computation load on the extraction unit 14 because the correction process uses the super-resolution process or complementary process only when desired (in the range of Ta≤MPIXp<Tb). Even if the extraction unit 14 fails to extract additional information, the extraction unit 14 may use previous additional information extracted before the time of failed extraction by carrying out a chronological tracking process, for example. In consideration of the possibility of slight degradation in accuracy of definition of the physical coordinate system, the extraction unit 14 may generate or extract controlled additional information having the additional information corrected. When the extraction unit 14 selects the controlled additional information, the controlled additional information may be stored in the storage unit 15 in FIG. 10, for example. The controlled additional information may be referred to as the controlled information to be displayed.

Figure 11B:
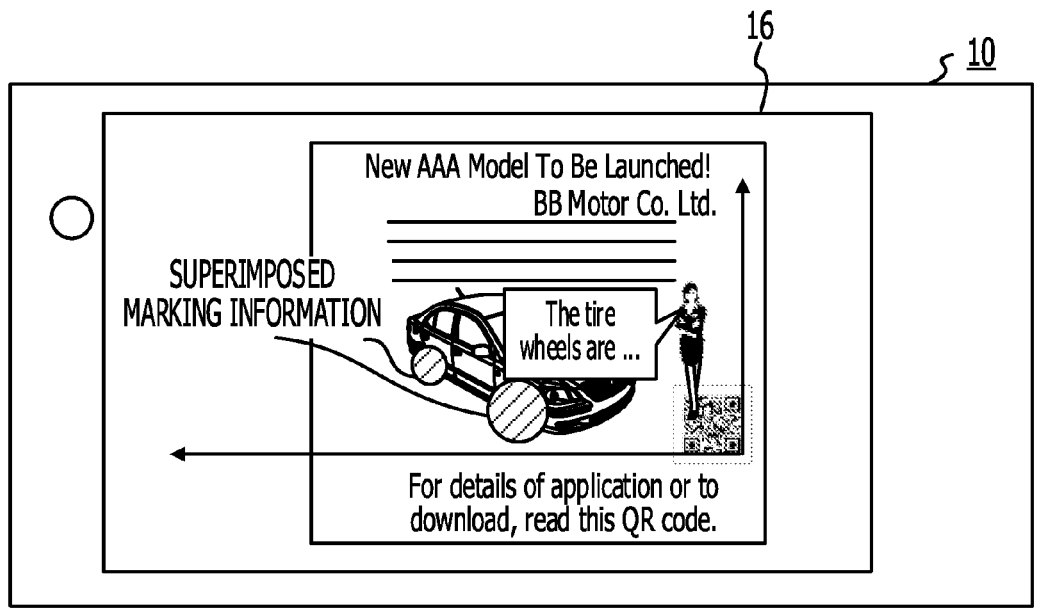
FIG. 11B illustrates an example of a superimposed image in the range of Ta≤MPIXp<Tb.

FIG. 11B illustrates an example of a superimposed image in the range of Ta≤MPIXp<Tb. In the superimposed image illustrated in FIG. 11B, the controlled additional information is displayed on the display unit 16 included in the information presentation device 10 in FIG. 8 such that the contours of the superimposed marking information become larger than the contours of the tier wheels in consideration of the possibility of slight degradation in accuracy of definition of the physical coordinate system.

In FIG. 10, in the range of Tb≤MPIXp<Tc, it is theoretically difficult for the extraction unit 14 to extract additional information. However, since the accuracy of definition of the physical coordinate system satisfies the accuracy desired for the supposed purpose, the extraction unit 14 may use the controlled additional information having the additional information corrected. The extraction unit 14 may skip the extraction process itself without extracting the additional information. If the imaging distance changes from the range of Ta≤MPIXp<Tb to the range of Tb≤MPIXp<Tc, the extraction unit 14 may use the additional information instead of the controlled additional information, because the extraction unit 14 has successfully extracted the additional information in the range of Ta≤MPIXp<Tb. On the other hand, when imaging is initially started in the range of Tb≤MPIXp<Tc, it is difficult to extract additional information. In this case, the extraction unit 14 may use, as the controlled additional information, superimposed marking information having its origin at any coordinates in the physical coordinate system or a text prompting the user to shorten the imaging distance.

Figure 12A:
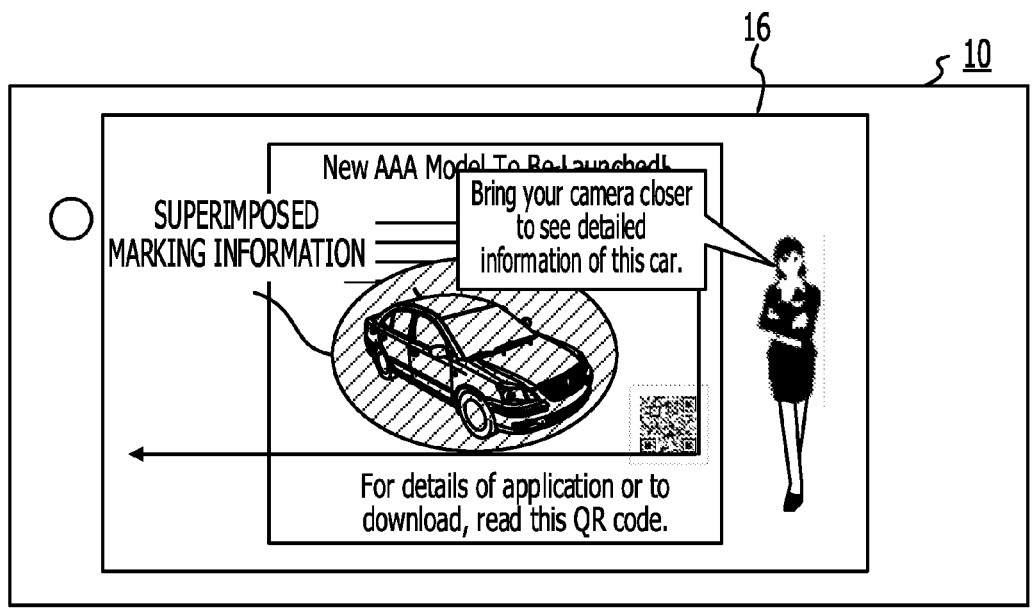
FIG. 12A illustrates an example of a superimposed image in the range of Tb≤MPIXp<Tc.

FIG. 12A illustrates an example of a superimposed image in the range of Tb≤MPIXp<Tc. In FIG. 12, the superimposed marking information as the controlled additional information is displayed with a size and shape that are not affected even if it is significantly displaced. This superimposed marking information may be defined as appropriate with its origin at any coordinates in the physical coordinate system. In the text spoken by the narrator, controlled additional information such as "Bring your camera closer to see detailed information of this car" may be displayed to prompt the user to shorten the imaging distance.

Figure 12B:
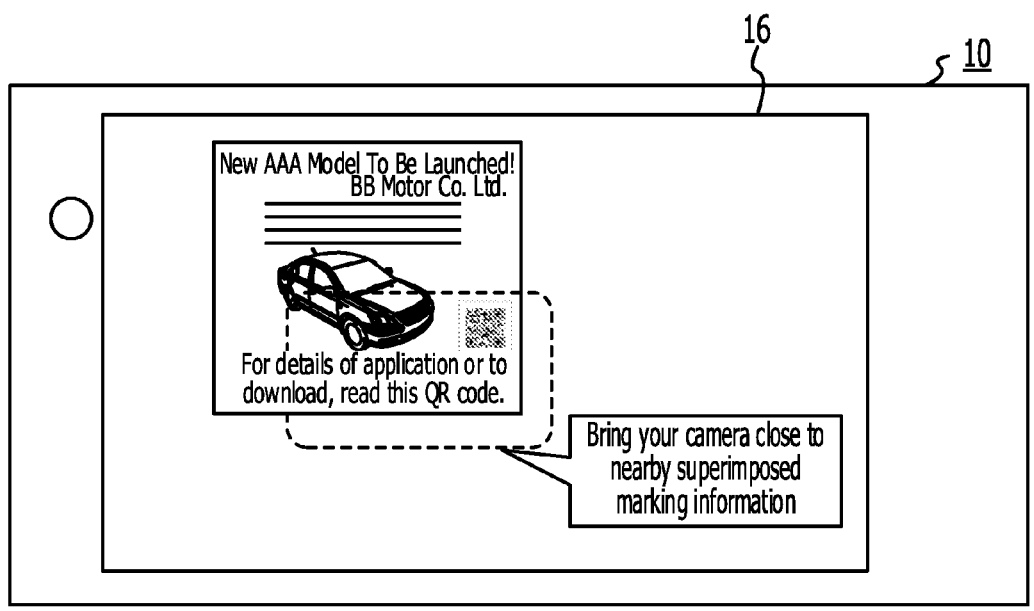
FIG. 12B illustrates an example of a superimposed image in the range of Tc≤MPIXp.

In FIG. 10, in the range of Tc≤MPIXp, in which the accuracy of definition of the physical coordinate system is below the desired accuracy, the extraction unit 14 may perform a process not to display the additional information, for example. The extraction unit 14 may perform a process to display the controlled additional information. FIG. 12B illustrates an example of a superimposed image in the range of Tc≤MPIXp. In FIG. 12B, a dotted-lined frame and a text such as "Bring your camera close to nearby superimposed marking information" to prompt the user to shorten the imaging distance may be displayed as the controlled additional information at or near the center of the display unit 16 included in the information presentation device 10.

Figure 13:
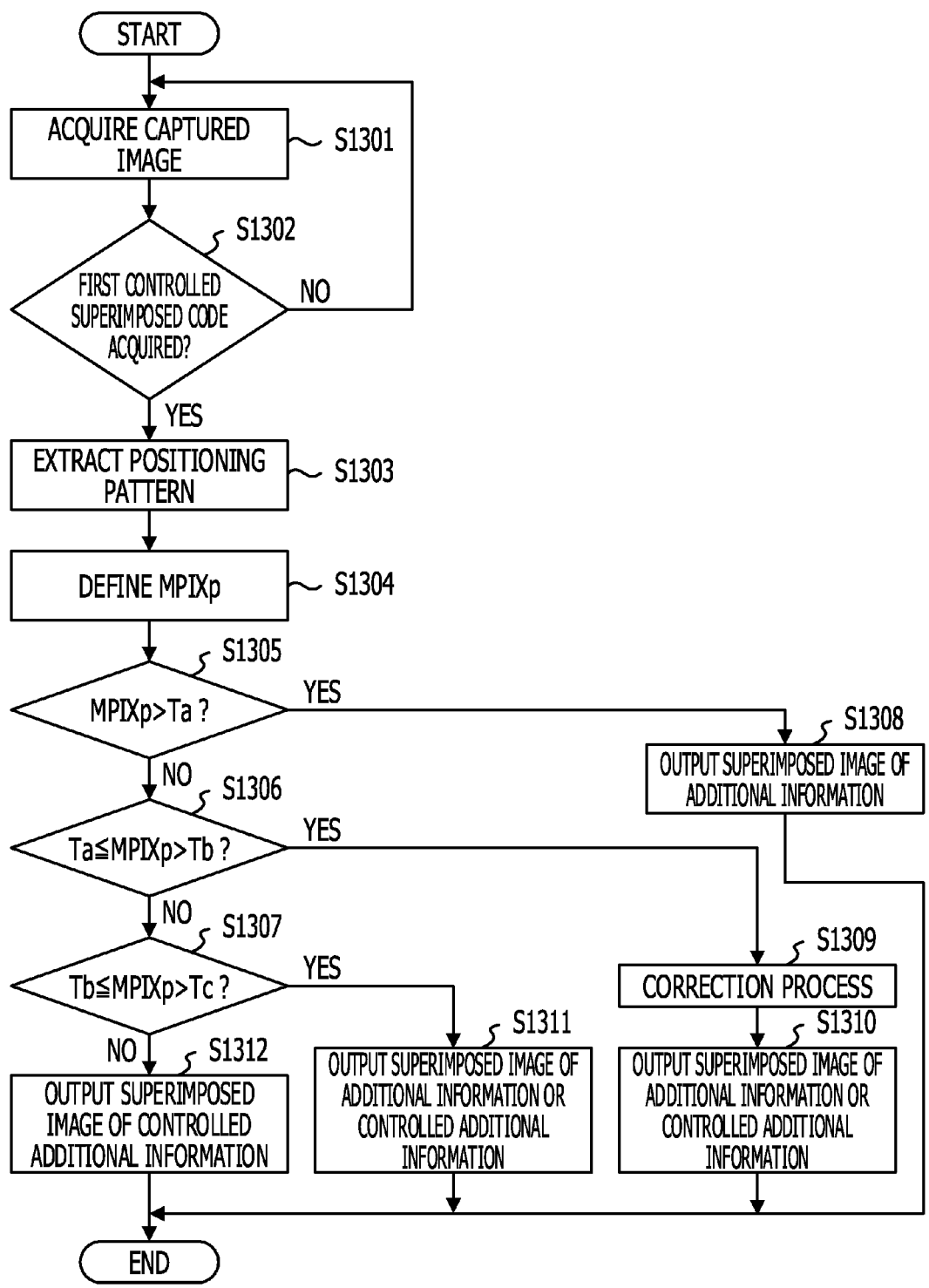
FIG. 13 is a flowchart illustrating second image processing performed by the image processing device.

FIG. 13 is a flowchart illustrating second image processing performed by the image processing device 11. The processing in steps S1301-S1303 in FIG. 13 is similar to the processing in steps S901-S903 in FIG. 9, detailed description of which will be omitted. The extraction unit 14 defines MPIXp from the extracted positioning pattern (step S1304). The value of αm, which is 25, for example, in the above Formulae 2 and 3, is assumed to have been stored in the cache or memory (not illustrated) in the extraction unit 14. The extraction unit 14 may receive information of am from the image processing device 1 in FIG. 4 via a communication unit (not illustrated).

The extraction unit 14 performs the following processing after defining as appropriate the predetermined values Ta (MPIX2d=3, for example), Tb (MPIX2d=2, for example), and Tc (MPIXp=1, for example) as described above.

If the condition of MPIXp>Ta is satisfied (Yes in step S1305), the extraction unit 14 outputs a superimposed image of additional information (step S1308). In step S1308, the superimposed image illustrated in FIG. 11A, for example, is output. The extraction unit 14 may perform the processing in steps S904-S907 in FIG. 9, if appropriate, when performing step S1308.

If the condition of MPIXp>Ta is not satisfied (No in step S1305) and the condition of Ta≤MPIXp<Tb is satisfied (Yes in step S1306), the extraction unit 14 extracts a two-dimensional code and performs a correction process on the extracted two-dimensional code using a super-resolution process or complementary process as appropriate (step S1309). The extraction unit 14 outputs a superimposed image of the additional information or controlled additional information (step S1310). In step S1310, the superimposed image in FIG. 11B, for example, is output. The extraction unit 14 may perform the processing in steps S904-S907 in FIG. 9, if appropriate, when performing step S1310.

If the condition of Ta≤MPIXp<Tb is not satisfied (No in step S1306) and the condition of Tb≤MPIXp<Tc is satisfied (Yes in step S1307), the extraction unit 14 outputs a superimposed image of the additional information or controlled additional information (step S1311). In step S1311, the superimposed image in FIG. 12A, for example, is output. The extraction unit 14 may determine to use either the additional information or the controlled additional information depending on whether or not the extraction unit 14 successfully extracts the additional information when the imaging distance changes from the range of Ta≤MPIXp<Tb to the range of Tb≤MPIXp<Tc. The extraction unit 14 may perform the processing in steps S904-S907 in FIG. 9, if appropriate, when performing step S1311.

If the condition of Tb≤MPIXp<Tc is not satisfied (No in step S1307, that is, the condition of Tc≤MPIXp is satisfied), the extraction unit 14 outputs a superimposed image of the controlled additional information (step S1312). In step S1312, the superimposed image in FIG. 12B, for example, is output.

The image processing device 11 completes the image processing illustrated in FIG. 13 by performing any one of steps S1308-S1312.

The image processing device in the fourth embodiment may give the user appropriate guidelines about image processing by making use of the relationship in module size between the two-dimensional code and the positioning pattern. The computation load on the image processing device may be reduced by performing the correction process using the super-resolution process or complementary process only when desired.

Fifth Embodiment

Figure 14:
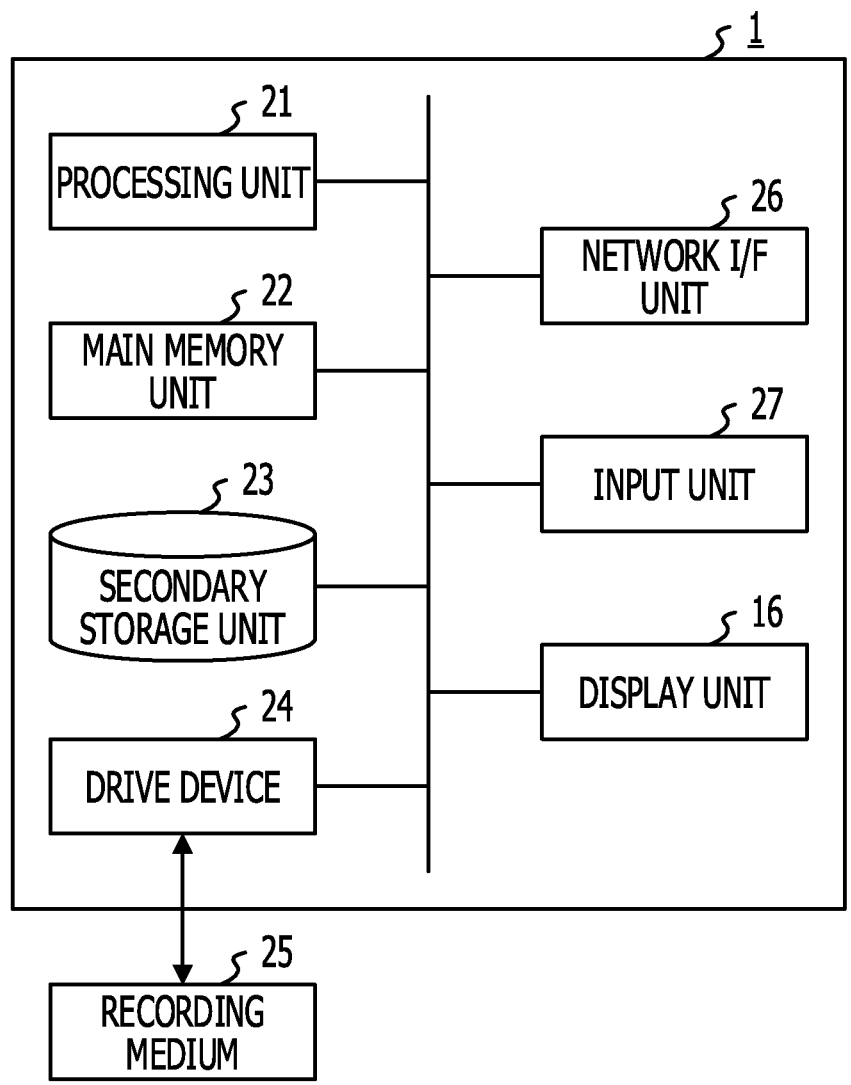
FIG. 14 illustrates a hardware configuration diagram of a computer serving as the image processing device according to an embodiment.

FIG. 14 illustrates the hardware configuration of a computer serving as the image processing device 1 or 11 according to an embodiment. As illustrated in FIG. 14, the image processing device 1 or 11 includes a processing unit 21, main memory unit 22, secondary storage unit 23, drive device 24, network interface (I/F) unit 26, input unit 27, and display unit 16. These components are mutually connected through a bus such that they may exchange data with each other.

The processing unit 21 is a central processing unit (CPU) that controls the devices in a computer and computes and processes data. The processing unit 21 is a computing device that executes programs stored in the main memory unit 22 and/or secondary storage unit 23 and receives data from the input unit 27 and/or storage device, computes and processes the data, and outputs the resultant data to the display unit 16 or storage device.

The main memory unit 22 includes a ROM and/or RAM and stores permanently or temporarily programs, such as the operating system, that is, the basic software executed by the processing unit 21, and application software, as well as data.

The secondary storage unit 23 is a hard disk drive (HDD) or other storage device that stores data related to the application software.

The drive device 24 reads programs from a recording medium 25 such as a flexible disk, for example, and installs the programs in the secondary storage unit 23.

Predetermined programs are stored in the recording medium 25 and then installed in the image processing device 1 or 11 via the drive device 24. Once installed, the predetermined programs are executable by the image processing device 1 or 11.

The network interface (I/F) unit 26 is an interface between the image processing device 1 or 11 and peripheral devices having communication functions connected via a local area network (LAN), wide area network (WAN), or other network configured with data transmission lines such as wired and/or wireless lines.

The input unit 27 has a keyboard equipped with cursor keys, numeric keys, various function keys, and other keys, a mouse to select keys on the display screen of the display unit 16, a stylus pad, and so on. The input unit 27 serves as a user interface through which the user inputs data and gives operation instructions to the processing unit 21.

The display unit 16 may include hardware equivalent to that of the display unit 16 in FIG. 8, detailed description of which will be omitted. The display unit 16 displays in response to the display data input from the processing unit 21.

The image processing method described above may be implemented as a program executed by a computer. When this program is installed from a server, for example, and executed by the computer, the image processing method described above may be achieved.

This program may be recorded in the recording medium 25 and read out of the recording medium 25 by the computer or a mobile terminal to achieve the image processing method described above. Various types of recording media may be used as the recording medium 25, such as a CD-ROM, flexible disk, magneto optical disk, or other recording medium that optically, electrically, or magnetically records information, or a ROM, flash memory, or other recording medium that electrically records information.

The components of the illustrated devices may not be configured physically as illustrated. This means that specific forms of distribution or integration of the devices is not limited to the illustrated forms; all or some of the devices may be distributed or integrated functionally or physically to any extent depending on various loads and usage. The various processes described in connection with the above embodiments may be achieved by executing programs prepared in advance in a computer such as a personal computer or work station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
a processor; and
a memory which stores a plurality of instructions, which when executed by the processor, cause the processor to execute,
acquiring an image to be displayed including a two-dimensional code and a positioning pattern superimposed,
wherein the two-dimensional code defines information to be displayed on the basis of an image pattern including a first pixel value and a second pixel value,
wherein the positioning pattern defines reference coordinates to display the information to be displayed;
extracting the two-dimensional code from the image, using a first color component to extract a pixel value identified as the first pixel value and a pixel value identified as the second pixel value; and
extracting the positioning pattern from the image using a second color component that identifies as identical to both pixel values that are identified as the first and second pixel values when the first color component is used.

2. The device according to claim 1,
wherein the positioning pattern defines the reference coordinates on the basis of an image pattern including the first pixel value;
wherein the positioning pattern is extracted by extracting the first pixel value as the pixel value identified as identical.

3. The device according to claim 1,
wherein the acquiring acquires the display image with a hue that has a third pixel value instead of the second pixel value, because the two-dimensional code and the positioning pattern are superimposed,
wherein a difference between the third pixel value and the first pixel value is equal to or more than a predetermined first threshold value when the extraction unit extracts the two-dimensional code using the first color component,
wherein a difference between the third pixel value and the first pixel value is less than the predetermined first threshold value when the extraction unit extracts the positioning pattern using the second color component.

4. The device according to claim 1,
wherein the extracting the two-dimensional code and the extracting the positioning pattern control the information to be displayed on the basis of a size of a module forming the two-dimensional code and a size of a module forming the positioning pattern.

5. The device according to claim 1,
wherein the positioning pattern has a rectangular shape and the reference coordinates thereof are defined on the basis of four corners or outer edges.

6. The device according to claim 1,
wherein a module forming the two-dimensional code is smaller in size than a module forming the positioning pattern.

7. The device according to claim 4,
wherein vertices of the positioning pattern are defined at four corners of the rectangular shape and associated with the four corners that serve as reference points to define the reference coordinates, and the outer edges are defined on the basis of four sides that connect the four corners.

8. The device according to claim 4,
wherein the extracting comprises:
calculating the ratio of the number of pixels extracted from the module forming the two-dimensional code to the number of pixels extracted from the module forming the positioning pattern;
determining, on the basis of the ratio and a predetermined threshold value, an accuracy of extraction of the information to be displayed included in the two-dimensional code; and
performing, on the basis of a result of the determination, a process to correct the two-dimensional code or to display controlled information to be displayed having the information to be displayed corrected.

9. An image processing method comprising:
acquiring an image to be displayed including a two-dimensional code and a positioning pattern superimposed,
wherein the two-dimensional code defines information to be displayed on the basis of an image pattern including a first pixel value and a second pixel value,
wherein the positioning pattern defines reference coordinates to display the information to be displayed;
extracting, by a processor, the two-dimensional code from the image, using a first color component to extract a pixel value identified as the first pixel value and a pixel value identified as the second pixel value; and
extracting the positioning pattern from the image using a second color component that identifies as identical to both pixel values that are identified as the first and second pixel values when the first color component is used.

10. The method according to claim 9,
wherein the positioning pattern defines the reference coordinates on the basis of an image pattern including the first pixel value;
wherein the positioning pattern is extracted by extracting the first pixel value as the pixel value identified as identical.

11. The method according to claim 9,
wherein the acquiring acquires the display image with a hue that has a third pixel value instead of the second pixel value, because the two-dimensional code and the positioning pattern are superimposed,
wherein a difference between the third pixel value and the first pixel value is equal to or more than a predetermined first threshold value when the extraction unit extracts the two-dimensional code using the first color component,
wherein a difference between the third pixel value and the first pixel value is less than the predetermined first threshold value when the extraction unit extracts the positioning pattern using the second color component.

12. The method according to claim 9,
wherein the extracting the two-dimensional code and the extracting the positioning pattern control the information to be displayed on the basis of a size of a module forming the two-dimensional code and a size of a module forming the positioning pattern.

13. The method according to claim 9,
wherein the positioning pattern has a rectangular shape and the reference coordinates thereof are defined on the basis of four corners or outer edges.

14. The method according to claim 12,
wherein vertices of the positioning pattern are defined at four corners of the rectangular shape and associated with the four corners that serve as reference points to define the reference coordinates, and the outer edges are defined on the basis of four sides that connect the four corners.

15. The method according to claim 12,
wherein the extracting comprises:
calculating the ratio of the number of pixels extracted from the module forming the two-dimensional code to the number of pixels extracted from the module forming the positioning pattern;
determining, on the basis of the ratio and a predetermined threshold value, an accuracy of extraction of the information to be displayed included in the two-dimensional code; and
performing, on the basis of a result of the determination, a process to correct the two-dimensional code or to display controlled information to be displayed having the information to be displayed corrected.

16. A non-transitory computer-readable storage medium storing an image processing program that causes a computer to execute a process comprising:
acquiring a image to be displayed including a two-dimensional code and a positioning pattern superimposed,
wherein the two-dimensional code defines information to be displayed using an image pattern including a first pixel value and a second pixel value,
wherein the image includes a two-dimensional code and a positioning pattern superimposed, wherein the positioning pattern defines reference coordinates to display the information to be displayed;
extracting the two-dimensional code from the image using a first color component to extract a pixel value identified as the first pixel value and a pixel value identified as the second pixel value; and
extracting the positioning pattern from the image using a second color component to extract a pixel value that is identified as the first pixel value when the first color component is used, and a pixel value that is identified as the second pixel value when the first color component is used, but identified as identical to the first pixel value when the second color component is used.

* * * * *